United States Patent
Blacklock

[15] 3,704,486
[45] Dec. 5, 1972

[54] FASTENER

[72] Inventor: Colin Francis Blacklock, Buckinghamshire, England

[73] Assignee: TRW Inc., Cleveland, Ohio

[22] Filed: April 6, 1971

[21] Appl. No.: 131,715

[52] U.S. Cl. ................................. 24/73 P, 85/5 R
[51] Int. Cl. ............................................. A44b 21/00
[58] Field of Search ............... 85/5, 80, DIG. 2; 16/2; 24/213 CS, 213 B, 213 R, 208 A, 214, 73 R, 73 P, 73 MF, 73 FT, 73 PF, 73 HS, 73 D, 73 PM, 73 AP, 73 B

[56] References Cited

UNITED STATES PATENTS

| | | | |
|---|---|---|---|
| 2,367,657 | 1/1945 | Boersma | 85/DIG. 2 UX |
| 3,181,411 | 5/1965 | Mejlso | 85/5 R |
| 3,203,105 | 8/1965 | Whistler et al. | 85/5 R X |
| 3,213,500 | 10/1965 | Thompson | 24/73 AP |
| 3,577,603 | 5/1971 | Seckerson et al. | 24/73 P |

FOREIGN PATENTS OR APPLICATIONS

| | | | |
|---|---|---|---|
| 1,574,188 | 7/1969 | France | 85/80 |
| 1,149,675 | 4/1969 | Great Britain | 85/5 R |

*Primary Examiner*—Donald A. Griffin
*Attorney*—Philip E. Parker, Gordon Needleman, James R. O'Connor and John Todd

[57] ABSTRACT

A fastener comprising a stud portion which is formed with a longitudinally extending slot making it radially compressible so that it can be engaged in an aperture in a first panel and a shank portion extending coaxially and oppositely from the stud portion and also formed with a longitudinally extending slot making it radially compressible so that it can be engaged in an aperture in a second panel wherein the stud portion and the shank portion are formed with facing shoulders adapted to locate behind the panel in which the said portion is engaged and the angle of inclination of the shoulder on the stud portion is greater than the angle of inclination of the shoulder on the shank portions whereby the resistance to removal of the stud portion from the aperture in the first panel is substantially greater than that of the shank portion from the aperture in the second panel.

7 Claims, 10 Drawing Figures

PATENTED DEC 5 1972 3,704,486

PATENTED DEC 5 1972 3,704,486
SHEET 2 OF 2
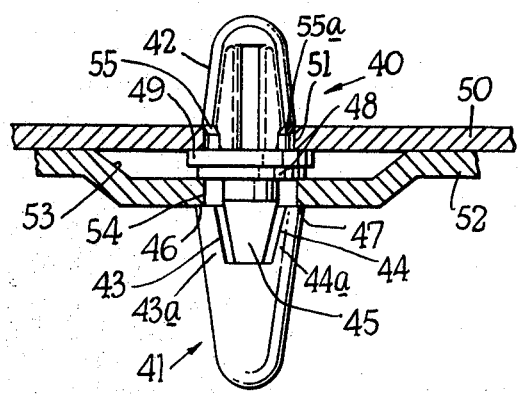
FIG.7.
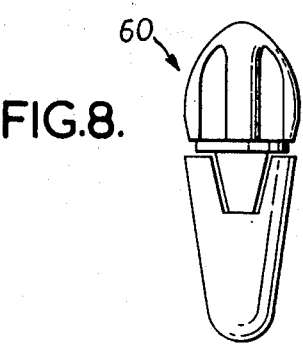
FIG.8.
FIG.9.
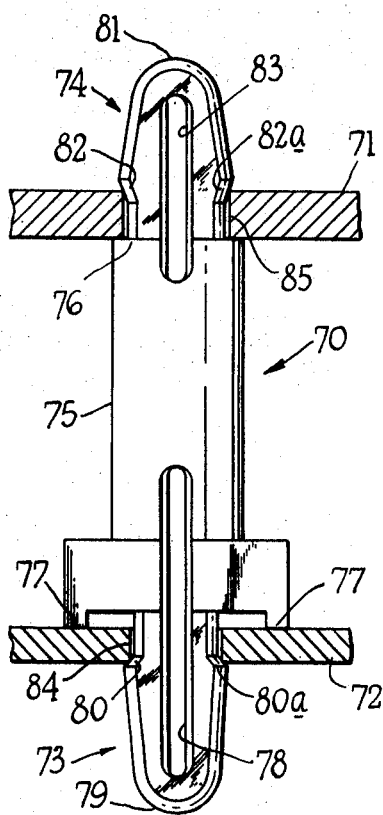
FIG.10.
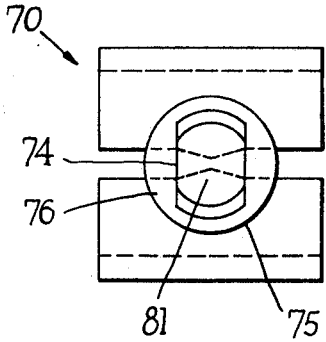

FASTENER

BACKGROUND TO THE INVENTION

The present invention relates to an improved fastener comprising a stud portion and a shank portion which is coaxial with the stud portion, the stud and shank being adapted to attach two apertured panels together in such a manner that one panel can be readily removed from the other.

It is known to attach two apertured panels together by passing a headed stud through two aligned apertures in the panels, in the manner of a rivet, to secure the two panels together. In this arrangement, if the upper panel has to be removed from the lower fixed panel, then it is necessary to withdraw the stud from the two panels before the upper panel can be removed.

It is also known to provide a fastener comprising a stud portion which is permanently fixed in the aperture in the lower fixed panel and with a shank portion which projects upwardly coaxially with the shank portion and which is adapted to locate through a hole in the removable panel so as to position the removable panel and align it with the lower fixed panel. However, this known type of fastener has the disadvantages that although it locates the upper panel it does not provide any resistance to removal of the upper panel from the lower panel. This known fastener also has a flange between the stud portion and the shank which serves to retain the stud portion in position through the aperture in the lower panel and which prevents the upper panel from being lowered directly onto the lower fixed panel in face to face relationship.

It is an object of the present invention to provide a fastener which can be used to attach two panels together in such a manner that one of the panels can be readily removed from the other when required, without the necessity for removing the fastener itself, and preferably in such a manner that the two panels lie flat one on the other.

STATEMENT OF THE INVENTION

According to the present invention there is provided a fastener comprising a stud portion which is formed with a longitudinally extending slot making it radially compressible so that it can be engaged in an aperture in a first panel and a shank portion extending coaxially and oppositely from the stud portion and also formed with a longitudinally extending slot making it radially compressible so that it can be engaged in an aperture in a second panel wherein the stud portion and the shank portion are formed with facing shoulders adapted to locate behind the panel in which the portion is engaged and the angle of inclination of the shoulder on the stud portion is greater than the angle of inclination of the shoulder on the shank portion whereby the resistance to removal of the stud portion from the aperture in the first panel is substantially greater than that of the shank portion from the aperture in the second panel.

DESCRIPTION OF THE DRAWINGS

FIG. 7 is an elevation, partly in section, showing a panel removably attached to a recessed, apertured support with the aid of a further modification of the fastener of the present invention, FIG. 8 is an elevation of a fastener forming yet a further embodiment of the invention, FIG. 9 is an elevation, partly in section, of a panel removably attached in spaced relationship to an apertured support with the aid of a fastener forming another modification of the invention, and FIG. 10 is an end view of the fastener shown in FIG. 9.

DESCRIPTION OF THE PREFERRED EMBODIMENTS

In FIGS. 1 to 4 a fastener is indicated generally at 10 which is formed from a resilient material such as a synthetic plastics, preferably by injection moulding.

Figure 4:
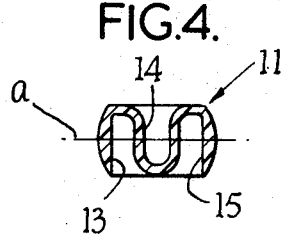
FIG. 4 is a section on the line IV—IV of FIG. 1.

The fastener 10 comprises a stud portion 11 and a shank portion 12 which is coaxial with the stud portion 11. On any transverse cross-section taken through the shank or the stud other than at the tips thereof, the shank or stud approximately oval, as shown in FIG. 4. The stud portion 11 is formed with three longitudinally extending slots 13, 14, 15, the slot 14 opening out of one side of the stud and the slots 13, 15 which lie on opposite sides of the slot 14, opening out of the other side of the stud. Similarly, the shank portion 12 is formed with three longitudinally extending slots 16, 17, 18, the slot 17 opening out of the same side of the shank portion 12 as the slot 14 in the stud portion 11 and the slots 16 and 18 opening out of the opposite side of the stud 12.

The slots 13 to 15 in the stud portion 11 extend into the shank portion 12 and render the stud portion 11 resiliently compressible in the direction of its major transverse axis $a$, see FIG. 4. Similarly, the slots 16 to 18 in the shank portion render the shank portion 12 resiliently compressible about its own major transverse axis, but to a lesser extent than the stud portion.

At the junction between the stud and the shank, the stud portion 11 is formed with a neck 19 which is defined by shoulders 20, 20a on the stud portion and facing abutment surfaces 21, 21a on the shank portion.

The shank portion 12 is formed with inclined shoulders 22, 22a which face generally in the direction towards the plane containing the shoulders 20, 20a of the stud portion 11 and which terminate at the abutment surfaces 21, 21a. From the shoulders 22, 22a the shank portion 12 tapers towards its tip 23 which is rounded and solid.

The stud portion 11 also tapers from the shoulders 20, 20a towards its tip 24 which is also rounded and solid.

Figure 1:
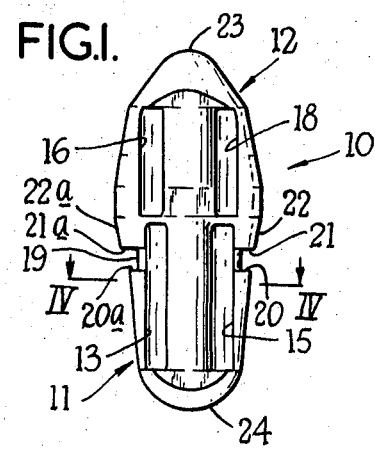
FIG. 1 is an elevation of a fastener according to the present invention.
Figure 2:
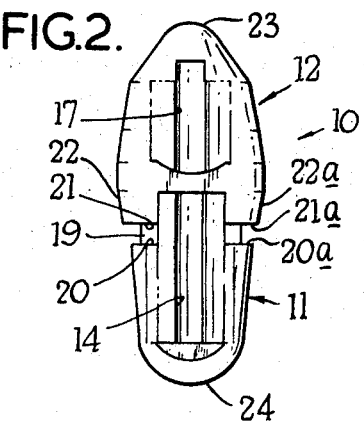
FIG. 2 is a rear elevation of the fastener of FIG. 1.
Figure 3:
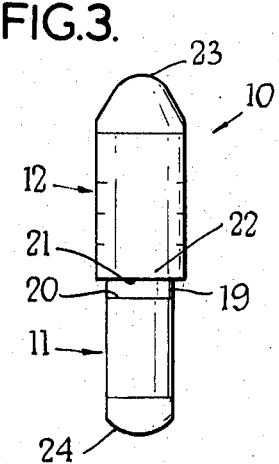
FIG. 3 is a side elevation of the fastener of FIG. 1.

As can be seen clearly from FIGS. 1 and 2, the shoulders 20, 20a of the stud portion 11 lie in a plane which is perpendicular to the longitudinal axis of the fastener 10 whereas the shoulders 22, 22a of the shank portion are inclined at a relatively small angle to the longitudinal axis.

Figure 5:
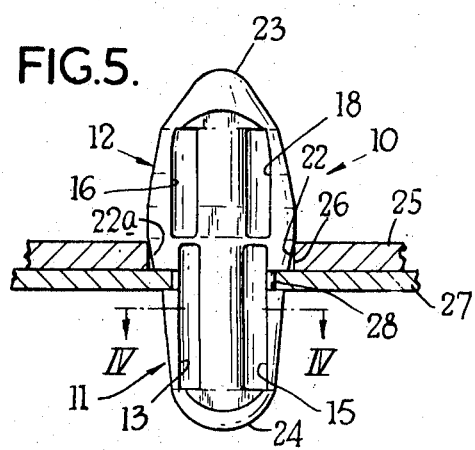
FIG. 5 is an elevation, partly in section, showing a panel removably attached to an apertured support with the aid of the fastener of FIGS. 1 to 3.

The fastener 10 is used, as shown in FIG. 5, to attach a panel 25 having a circular aperture 26 to a fixed support 27 which is formed with a circular aperture 28. The stud portion 11 of the fastener 10 is first attached to the support 27 by passing the stud portion 11 through the aperture 28 until the rim of the aperture snaps into the neck 19 so as to be retained therein by the shoulders 20, 20a which locate behind the support. Insertion of the fastener 10 through the aperture 28 is limited by the abutment surfaces 21, 21a and the fastener 10 is thus permanently attached to the support 27 and cannot be removed therefrom without the use of considerable force. When the fastener 10 is attached to the support 27, the shank portion 12 projects upwardly from the upper surface of the support 27. The panel 25 is then lowered towards the support 27 so that the shank portion 12 enters and passes through the aperture 26. As the shank portion 12 enters the aperture 26 the shank is compressed about its major transverse axis until a part of the inclined shoulders 22, 22a have passed through the aperture. Thereafter, the shoulders provide a firm friction grip on the rim of the aperture 26. The panel 25 can be passed over the shank portion 12 until it rests upon the upper surface of the support 27 where it is retained in position by the friction exerted on the rim of the aperture 26 by the shoulders 22, 22a.

If at any time it is necessary to remove the panel 25 from the support 27, all that is necessary is to provide a sufficient upward pull on the panel 25 to overcome the friction grip exerted on the panel 25 by the shoulders 22, 22a of the shank portion 12. As an upward pull is exerted on the panel 25, the stud portion 11 of the fastener remains firmly secured to the support 27 by virtue of the shoulders 20, 20a which provide a positive abutment against the undersurface of the support 27. Thus, the panel 25 can be removed and replaced from the support 27 as often as necessary without any risk of damage to the fastener. It will also be seen that the panel 25 can be placed flush against the support 27, which in many applications is essential.

Figure 6:
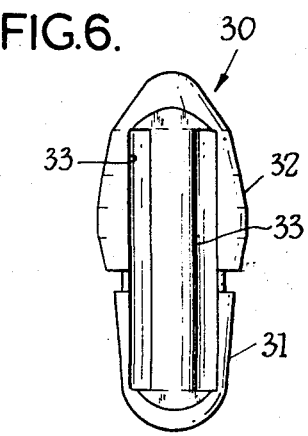
FIG. 6 is an elevation of a modification of the fastener of FIGS. 1 to 3.

In a modification of the fastener 10, which is shown at 30 in FIG. 6, the three slots 33 (only two of which are shown) formed in the stud portion 31 and shank portion 32 extend continuously through stud portion and the shank portion. This adds to the resilience of the stud portion and the shank portion but in all other respects the fastener 30 is similar to the fastener 10 and is used in the same manner.

FIG. 7 illustrates a fastener 40 which is yet a further modification of the fastener 10, the fastener 40 comprising a stud portion 41 and a shank portion 42 which is substantially similar to the shank portion 12 of the fastener 10.

The stud portion 41 differs from the stud portion 11 of the fastener 10 in that it is formed with two inclined slots 43 and 44 which form a solid central stem 45 and two flexible tongues 43a and 44a. The ends of the tongues 43a and 44a are directed towards the shank portion 42 and their end faces 46, 47 form shoulders which lie in a plane which is perpendicular to the longitudinal axis of the fastener.

The stud portion 41 also includes an annular collar 48 which is adapted to limit insertion of the stud portion 41 through an aperture and an annular flange 49 which acts as a spacing member and which also serves to limit insertion of the shank portion 42 through an aperture.

As shown in FIG. 7 the fastener 40 is used to attach a removable panel 50 formed with a circular aperture 51 to a fixed support member 52 which is formed with a recess 53 and an aperture 54 positioned centrally of the recess 53.

In order to attach the fastener 40 to the fixed support 52 the stud portion 41 of the fastener is passed through the aperture 54. As the stud portion 41 enters the circular aperture 54, the tongues 43a and 44a are compressed inwardly until they pass completely through the aperture whereupon they spring outwardly and the end shoulder faces 46 and 47 locate behind the support 52 to retain the fastener on the support. The collar 48 forms an abutment surface limiting insertion of the stud portion 41 through the aperture 54 and the collar 48 and flange 49 form a spacing member which substantially fills the depth of the recess 53.

In order to attach the panel 50 to the support 52, the panel 50 is lowered onto the shank portion 42 which passes through the aperture 51 in the panel 50 until the panel 50 is located flush against the support 52 and also against the flange 49 of the fastener. In this position shoulders 55, 55a on the shank portion 42 are located behind the rim of the aperture 51 in the panel 50 to retain the panel 50 against the support 52. In order to move the panel 50 all that is necessary is to give an upward pull on the panel 50 to draw it away from the support 52. The shank is then compressed to allow the shoulders 55, 55a of the shank to pass through the aperture 51.

A modification of the fastener 40 is indicated generally at 60 in FIG. 8, the fastener 60 being substantially similar to the fastener 40 except that the collar 48 is eliminated so that the fastener 60 can be used in an assembly similar to that shown in FIG. 5. In all other respects the fastener 60 is similar to the fastener 40.

FIGS. 9 and 10 illustrate yet a further modification of the fastener 10 shown in FIGS. 1 to 5 which is used to removably attach a panel 71 to a fixed support 72 in such a manner that the panel 71 is spaced a substantial distance from the support 72.

The fastener 70 comprises a stud portion 73, a shank portion 74 which is coaxial with the stud portion 73 and a body portion 75. The stud portion and the shank portion extend outwardly and oppositely from the ends of the body portion 75 and the body portion 75 is formed at its opposite ends with abutment surfaces 76 and 77.

The stud portion 73 is formed with an elongate slot 78 which extends into the body portion 75 and which terminates short of a rounded tip 79 of the stud portion. The stud portion is also formed with inclined shoulders 80, 80a which face the body portion 75 and which are spaced from the abutment faces 77 of the body portion 75.

The shank portion 74 is similar to the stud portion 73 having a rounded tip 81, inclined shoulders 82, 82a and a slot 83 which extends into the body portion 75 and which terminates short of the tip 81.

As can be seen clearly from FIG. 9, the shoulders 80, 80a on the stud portion 73 are inclined to the axis of the fastener at a substantially shallower angle than the shoulders 82, 82a on the shank portion 74. In addition the slot 78 is substantially longer than the slot 83 so as to render the stud portion 73 more resilient than the shank portion 74.

In use, the fastener 70 is attached to the support 72, which is provided with a circular aperture 84, by forcing the stud portion 73 of the fastener 70 through the aperture 84 until the shoulders 80, 80a engage behind the rim of the aperture 84. The slot 78 in the stud portion 73 renders the stud portion sufficiently resilient for the stud portion to collapse as it enters the aperture. However, once the shoulders 80, 80a are engaged behind the rim of the aperture they, thereafter, resist withdrawal of the stud portion 73 from the aperture 84. When the stud portion 73 is engaged in the aperture 84 the body portion 75 and the shank portion 74 project outwardly from the support 72 and the panel 71, which is formed with a circular aperture 85, is brought down onto the shank portion 74 so that the shank portion passes through the aperture 85. As the shank portion passes through the aperture 85 it collapses radially until the shoulders 82, 82a engage behind the rim of the aperture 85. Thereafter, the shoulders 82, 82a resist withdrawal of the panel 71 from the fastener 10 but to a lesser extent than the shoulders 80, 80a resist withdrawal of the fastener from the aperture 84. Thus, if at any time it is necessary to remove the panel 71 from the support 72 this can be done quickly and easily by providing an upward pull on the panel 71.

It will be apparent that the abutment surfaces 76 and 77 limit insertion of the stud portion 73 through the aperture 84 and insertion of the shank portion 74 through the aperture 85 respectively.

Further minor modifications can be made to the above described embodiment without departing from the spirit and scope of the invention which is best described in the following claims.

What I claim is:

1. A fastener comprising a stud portion which is formed with a longitudinally extending slot making it radially compressible so that it can be engaged in an aperture in a first panel and a shank portion extending coaxially and oppositely from the stud portion and also formed with a longitudinally extending slot making it radially compressible so that it can be engaged in an aperture in a second panel wherein the stud portion and the shank portion are formed with facing shoulders adapted to locate behind the panel in which the said portion is engaged and the angle of inclination of the shoulder on the stud portion is greater than the angle of inclination of the shoulder on the shank portion whereby the resistance to removal of the stud portion from the aperture in the first panel is substantially greater than that of the shank portion from the aperture in the second panel.

2. A fastener as claimed in claim 1, wherein the shoulder on the stud portion lies in a plane substantially at right angles to the longitudinal axis of the fastener.

3. A fastener as claimed in claim 2, wherein the slot in the stud portion extends into the shank portion.

4. A fastener as claimed in claim 3, wherein both the shank portion and the stud portion are oval on any transverse section therethrough and wherein both the shank portion and the stud portion are formed with three elongate slots so arranged that the shank portion and the stud portion are radially compressible along their major transverse diameters.

5. A fastener as claimed in claim 1, wherein the stud portion is formed with two said slots which form two tongues, the ends of which are directed towards the shank portion and form the shoulder on the stud portion.

6. A fastener as claimed in claim 1, wherein a body portion is provided between the stud portion and the shank portion, the body portion being adapted to limit insertion of the stud portion and the shank portion into their respective apertures.

7. A fastener as claimed in claim 1, wherein the shank portion is provided with ab abutment face between the shoulder thereon and the stud portion, arranged in a plane substantially at right angles to the longitudinal axis of the fastener and adapted to limit insertion of the stud portion into an aperture.

* * * * *

UNITED STATES PATENT OFFICE
CERTIFICATE OF CORRECTION

Patent No. 3,704,486     Dated December 5, 1972

Inventor(s) Conlin Francis Blacklock

It is certified that error appears in the above-identified patent and that said Letters Patent are hereby corrected as shown below:

On the cover sheet insert the following:

-- 30 Foreign Application Priority Data

April 6, 1970    Great Britian    16131

Column 6, line 37, (Claim 7, line 2), "ab" should read -- an --.

Signed and sealed this 26th day of March 1974.

(SEAL)
Attest:

EDWARD M. FLETCHER, JR.
Attesting Officer

C. MARSHALL DANN
Commissioner of Patents